A. H. CARLSON.

ADJUSTABLE HOLDER.

APPLICATION FILED APR. 6, 1922.

Reissued Aug. 15, 1922.

15,431.

INVENTOR.

Andrew H. Carlson

BY Wooster & Davis

ATTORNEYS.

UNITED STATES PATENT OFFICE.

ANDROV H. CARLSON, OF BRIDGEPORT, CONNECTICUT, ASSIGNOR TO THE PRESTOY MANUFACTURING COMPANY, OF BRIDGEPORT, CONNECTICUT.

ADJUSTABLE HOLDER.

15,431. Specification of Reissued Letters Patent. Reissued Aug. 15, 1922.

Original No. 1,335,724, dated April 6, 1920, Serial No. 336,720, filed November 8, 1919. Application for reissue filed April 6, 1922. Serial No. 550,189.

*To all whom it may concern:*

Be it known that I, ANDROV H. CARLSON, a citizen of the United States, residing at Bridgeport, in the county of Fairfield and State of Connecticut, have invented certain new and useful Improvements in Adjustable Holders; and I do hereby declare the following to be a full, clear, and exact description of the invention, such as will enable others skilled in the art to which it appertains to make and use the same.

My invention relates to adjustable supporting bases or holders for flag poles, signal posts and like articles.

Referring to the drawings wherein the same figures of reference indicate like parts throughout the several views, Figure 1 represents an elevation of the device and broken view of a flag pole secured thereto;

Figure 1:
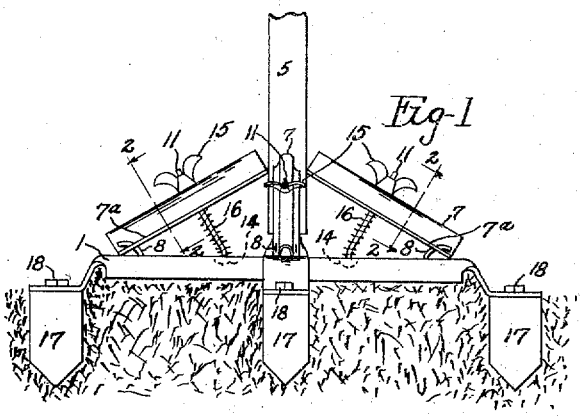
Figure 3:
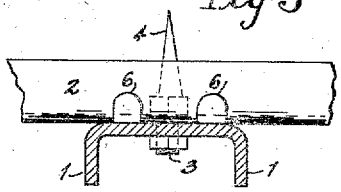
Fig. 3 is an enlarged broken view of the upper base plate and sectional view of the underlying plate on line 3—3 of Fig. 2.

The several metal elements comprising the holder are of the same general construction but varying in size to suit different articles to be supported. 1 and 2 are channel iron base plates held together by the bolt 3 whose pointed end or spur 4 serves as a central locating point for the lower end of the pole 5. The integral prongs 6 of the under plate 1 are brought against opposite sides of the upper plate 2 to firmly maintain its right angle position with respect to the under plate 1.

7 are channel iron side braces whose inner ends are brought against the pole and their outer ends in contact with the base plates and secured thereto by means of the curved prongs 8 interlocking with the holes 9 of the flanges 7ª of said braces.

Figure 2:
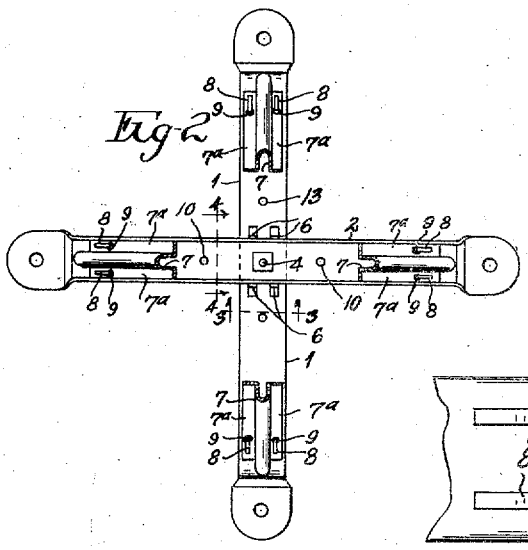
Fig. 2 is a plan view of the base plates and sectional view of the side braces on lines 2—2 of Fig. 1.
Figure 4:
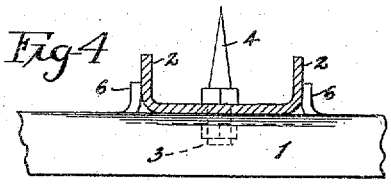
Fig. 4 is an enlarged broken view of the lower base plate and sectional view of the upper base plate on line 4—4 of Fig. 2.
Figure 5:
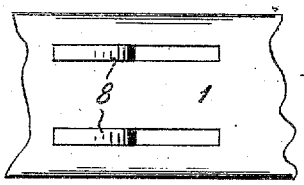
Fig. 5 is an enlarged broken view of a section of the base plates showing the means integral therewith for connecting the side braces thereto.
Figure 6:
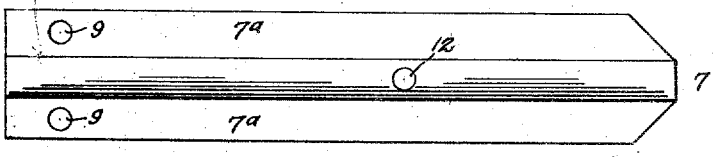
Fig. 6 is an enlarged broken plan view of one of the side braces.

The adjustable feature for the side braces to accommodate poles of different sizes consists of the floating bolts 11 passing freely through holes in the braces, one of which, 12, is shown in Fig. 6, and also freely through holes 13, Fig. 2, of the base plates 1 and 2. The heads of these bolts engage the under side of the base plates. The nuts 15 exert a downward pressure on the pole and thus maintain it firmly against the spur 4, and the springs 16 exert an outward pressure as the nuts are loosened.

For out-door use, the several metal elements will be properly proportioned as to size and strength to support ordinary flag poles, for which purpose the wood blocks 17 are first driven into the ground and the base plates secured thereto by the bolts 18. The holder is so constructed that it is capable of being readily assembled or taken apart and packed in a small space.

Having thus described my invention, what I claim is:—

1. A metal holder of the character described, comprising two channel iron base plates, a centrally located bolt connecting the base plates, said bolt having a pointed end, means integral with one plate engaging the other plate to maintain the latter at right angles to the former, inclined side braces having openings at their outer ends, means integral with the base plates interlocking with said openings, bolts projecting through the base plates and side braces, means connected with said bolts to exert a downward pressure on the side braces, and springs adapted to exert an outward pressure on the braces when the downward pressure has been released.

2. A holder of the character described, comprising two base plates, a bolt connecting the base plates, said bolt having a pointed end, means carried by one plate engaging the other plate to maintain the plates in angular relation, inclined side braces, interlocking means carried by the braces and base plates comprising an opening in one element and a curved finger carried by the other element and extending through said opening, bolts projecting through the base plate and side braces, means connected with said bolts to exert a downward pressure on the side braces, and means adapted to exert an outward pressure on the side braces.

3. A holder of the character described, comprising two channel iron base plates, a substantially centrally located bolt connecting said base plates, said bolt having a pointed end, means pressed from and integral with one base plate and engaging the other to maintain the plates at substantially right angles to each other, inclined side braces, interlocking means carried by the outer ends of the side braces and the base plates comprising openings in one of said members and fingers integral with the other member interlocking with said openings, bolts projecting through the base plates and side braces and means connected with said bolts to exert a downward pressure on the side braces.

4. A holder of the character described comprising two channel iron base plates, a substantially centrally located bolt connecting said base plates, said bolt having a pointed end, means integral with one base plate and engaging the other to maintain the plates at substantially right angles to each other, inclined side braces, interlocking means carried by the outer ends of the side braces and the base plates comprising openings in one of said members and means integral with the other member interlocking with said openings, bolts projecting through the base plates and side braces, means connected with said bolts to exert a downward pressure on the side braces, and means adapted to exert an outward pressure on the braces.

In testimony whereof I affix my signature.

ANDROV H. CARLSON.